United States Patent [19]

Mourier

[11] Patent Number: 5,042,931
[45] Date of Patent: Aug. 27, 1991

[54] SYSTEM OF MIRRORS FOR GUIDING AN ELECTROMAGNETIC WAVE

[75] Inventor: Georges Mourier, Mareil-sur-Mauldre, France

[73] Assignee: Thomson-CSF, Puteaux, France

[21] Appl. No.: 343,375

[22] Filed: Apr. 26, 1989

[30] Foreign Application Priority Data

Apr. 29, 1988 [FR] France .................................. 88 05794

[51] Int. Cl.$^5$ ......................... G02B 27/14; G02B 5/08; G02B 5/10
[52] U.S. Cl. .................................... 359/858; 359/857; 359/861; 359/618
[58] Field of Search .................... 350/170–174, 350/500–505, 612, 617, 618–620, 622–624, 600, 602, 628, 321; 356/334

[56] References Cited

U.S. PATENT DOCUMENTS

| | | | |
|---|---|---|---|
| 3,224,330 | 12/1965 | Kompfner | 350/619 |
| 3,762,794 | 10/1973 | Arnaud | 350/619 |
| 4,088,884 | 5/1978 | Rast et al. | 350/622 |
| 4,268,338 | 5/1981 | Winders | 350/628 |
| 4,429,953 | 2/1984 | Zehnpfennig et al. | 350/628 |
| 4,571,812 | 2/1986 | Gee | 350/628 |
| 4,586,795 | 5/1986 | Ono et al. | 350/619 |
| 4,776,696 | 10/1988 | Hettrick et al. | 356/334 |

FOREIGN PATENT DOCUMENTS 0022346 1/1981 European Pat. Off. .

OTHER PUBLICATIONS

"Focusing and Deflection of Optical Beam by Cylindrical Honors", Applied Optics, vol. 9, No. 10, Oct. 1970; Arnauld et al., pp. 2377–2380.
Review of Scientific Instruments, vol. 57, No. 8, Part 2, Aug. 1986, pp. 2119–2123, J. H. Underwood.
Nuclear Instruments & Methods in Physics Research, vol. 222, No. 1, May 1984, pp. 122–123, G. E. Ice et al.

Primary Examiner—Rodney B. Bovernick
Assistant Examiner—Thong Nguyen
Attorney, Agent, or Firm—Oblon, Spivak, McClelland, Maier & Neustadt

[57] ABSTRACT

A system of at least three concave mirrors (M1, M2, M3 ...) of cylindrical form are arranged with the concave part of the first mirror M1 facing towards the second mirror M2 and with the planes defined by the straight sections of the two mirrors which are perpendicular to each other. The arrangement further has the concave part of the third mirror M3 facing towards the second mirror M2 with the planes defined by the straight sections of the two mirrors M3, M2 perpendicularly to each other. Successive mirrors are placed in a crosswise fashion with respect to their nearest neighbor in order to provide for applications in the guiding of millimeter and sub-millimeter electromagnetic waves for plasma physics.

8 Claims, 4 Drawing Sheets

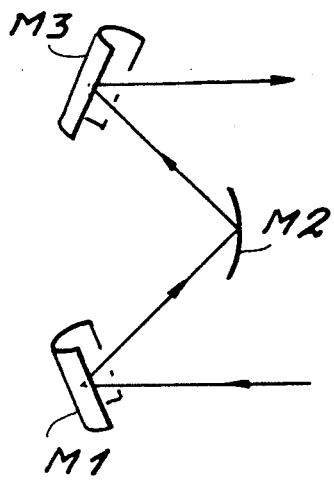
FIG. 5
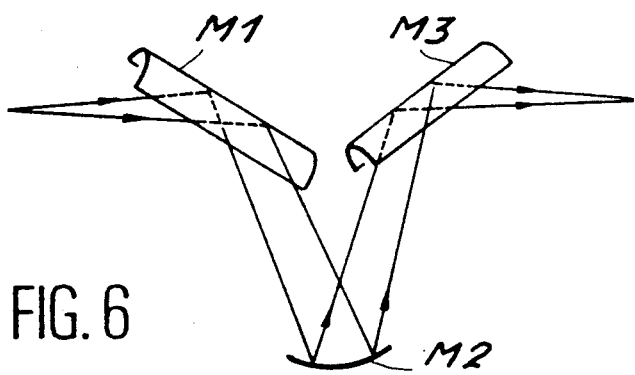
FIG. 6
FIG. 7
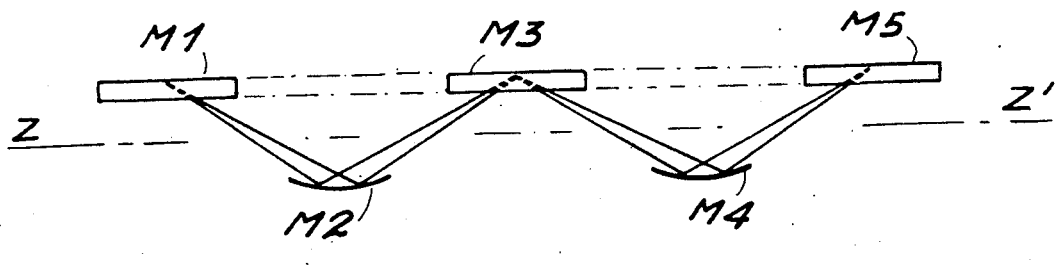
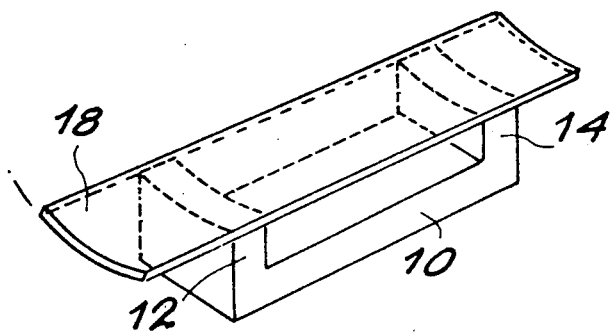
FIG. 8

SYSTEM OF MIRRORS FOR GUIDING AN ELECTROMAGNETIC WAVE

BACKGROUND OF THE INVENTION

1. Field of the Invention

The invention concerns a system of mirrors for guiding an electromagnetic (EM) wave. One application for such a system is in the field of plasma physics, where it can be used to guide a millimeter or submillimeter wave from a generator to a plasma machine for various purposes (ionization, heating, measurements of density or stability, etc . . .).

2. Discussion of Background

When the wavelength is greater than 3 mm, oversized waveguides are generally used. It is possible to maintain the wave propagation in a chosen propagation mode, TE01, for example, over a distance which can be as great as several tens of meters.

For shorter wavelengths, it has been demonstrated that systems of mirrors are more advantageously used, even though they are bulkier. This is related to the fact that the energy losses of an EM beam are independent of the diameter of the beam, whereas the distance between the mirrors increases with the surface area of the mirrors for a given maximum loss due to diffraction.

The known prior art is illustrated in FIG. 1. Such a system is described in the article by Mr. G. Faillon and Mr. G. Mourier titled "Developments in Microwave Tubes for RF Heating of Plasmas" published in *Proceedings of the 2nd Joint Grenoble-Varenna International Symposium*, which was held at Olmo, Italy from Sept. 3 to 12, 1980.

In such a system, mirrors E1, E2, . . . with an ellipsoidal form are used. Successive images are formed within the ellipsoids, aligned along their common axis.

Although such a system is satisfactory from certain points of view, it is difficult to construct because of the ellipsoidal form of the mirrors.

In the same field of applications, there is also a need to modify the general direction of propagation of an EM wave: for example an EM wave may come out from a generator in a vertical direction whereas the enclosure for the use of the EM wave may be found at a horizontal distance from the generator.

In such a case, as shown in FIG. 2, one can also use an elliptical mirror M, which deviates the beam and reconcentrates it in a different direction.

One can use several mirrors of this type, placed end to end.

This solution, although simpler than the preceding one, still presents certain inconveniences. If the beam has a circular cross section, the form of the mirror must be more and more elliptical as the incident angle alpha increases. Furthermore, the focal length is not the same in the plane of the reflection as in the perpendicular plane. A parallel beam will converge at a distance R/2 cos (alpha) in the plane of reflection and at a distance R/2 in the perpendicular plane, where R is the radius of curvature.

In order to concentrate a beam at a single point at a distance f, it would in fact be necessary to use a mirror with two curvatures, equal respectively to:

$R_i = 2f/\cos(\alpha)$ in the plane of reflection, and $R = 2f$ in the perpendicular plane.

The difficulties of realization for such mirrors with two different radii of curvature are considerable, and the situation is not much improved with respect to that of ellipsoidal mirrors.

SUMMARY OF THE INVENTION

An object of the present invention is thus to overcome these inconveniences by proposing a system of mirrors which is easy to construct and easy to put into use.

To accomplish this, the present invention proposes a system of at least three concave mirrors (M1,M2,M3 . . .) of cylindrical form, arranged with the concave part of the first mirror (M1) facing towards the second mirror (M2), with the planes defined by the straight sections of the two mirrors (M1,M2) perpendicular to each other, and further arranged with the concave part of the third mirror (M3) facing towards the second mirror (M2), with the planes defined by the straight sections of the two mirrors (M3,M2) perpendicular to each other, and so forth (in other words, the successive mirrors are placed in a "crosswise" fashion with respect to their nearest neighbors).

In this definition, the word "cylindrical" is to be interpreted in a strict geometrical sense, that is, a surface formed by displacing a straight line generator, always parallel to itself, about a curve. The curve could be circular, in which case the cylinder is circular, but could also be parabolic (parabolic cylinder), or elliptical, or any other curve.

The independence of the individual mirrors allows to give each one the desired curvature, in such a manner as to obtain a single, desired focal length for the system.

A great number of various embodiments of the invention are possible. In a symmetrical arrangement of three mirrors, for example, such as shown in FIG. 4, one could use the same radius of curvature: R = 2f/cos (alpha) for the first and third mirrors, and a curvature R' = 2f'/cos (alpha') for the intermediate mirror, where alpha and alpha' are the respective incident angles and f and f' the respective focal lengths.

In another embodiment according to the invention, as shown schematically in FIG. 7, the system consists of a number of mirrors arranged in an alternating fashion about a central axis, with their generators alternatively perpendicular and parallel to this axis.

BRIEF DESCRIPTION OF THE DRAWINGS

The nature of the present invention and its various features will appear more fully upon consideration of the following description and various illustrations which are given as non-limitative examples, referring to the attached drawings among which:

FIG. 5 shows another realization according to the invention incorporating three mirrors, FIG. 6 shows yet another realization according to the invention incorporating three mirrors, FIG. 7, already described, shows an embodiment according to the invention of a system of cylindrical mirrors distributed in alternating fashion on either side of a central axis, FIG. 8 illustrates a possible mode of realizaton of a cylindrical mirror.

Figure 1:
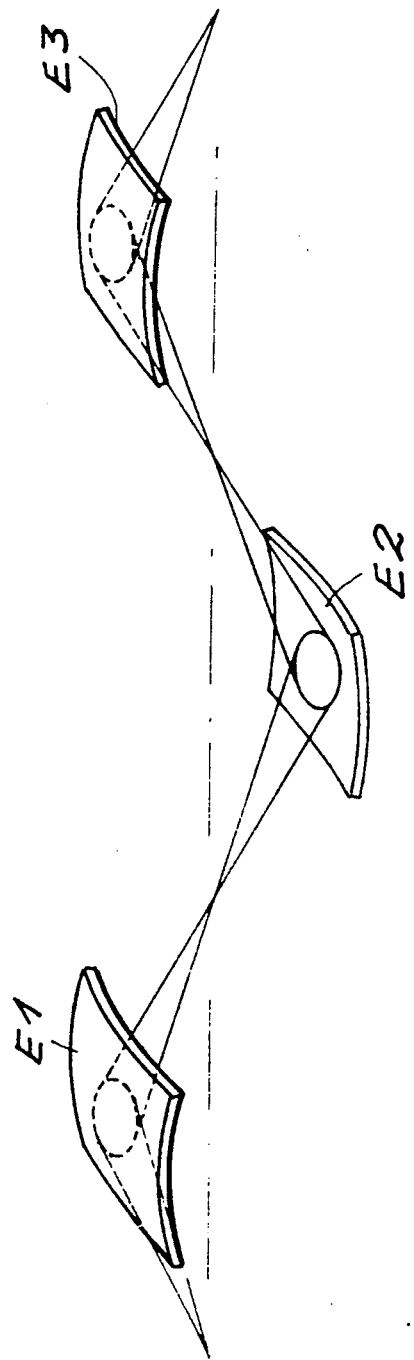
FIG. 1, already described, shows a system known in the prior art.
Figure 2:
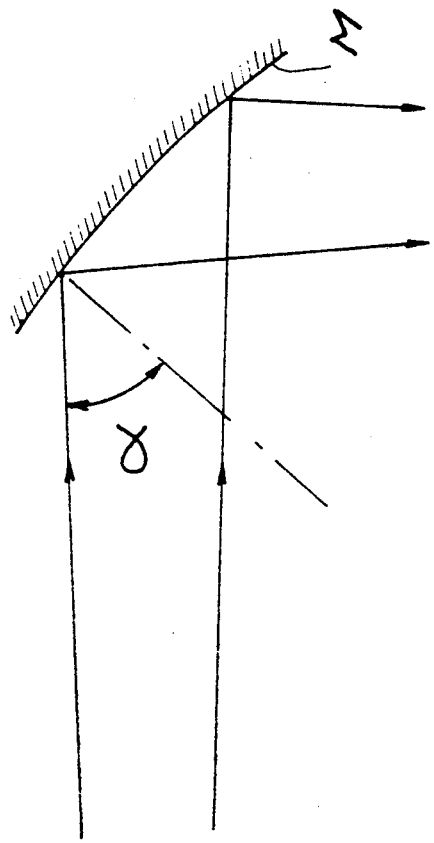
FIG. 2, already described, shows a spherical mirror known in the prior art.
Figure 3:
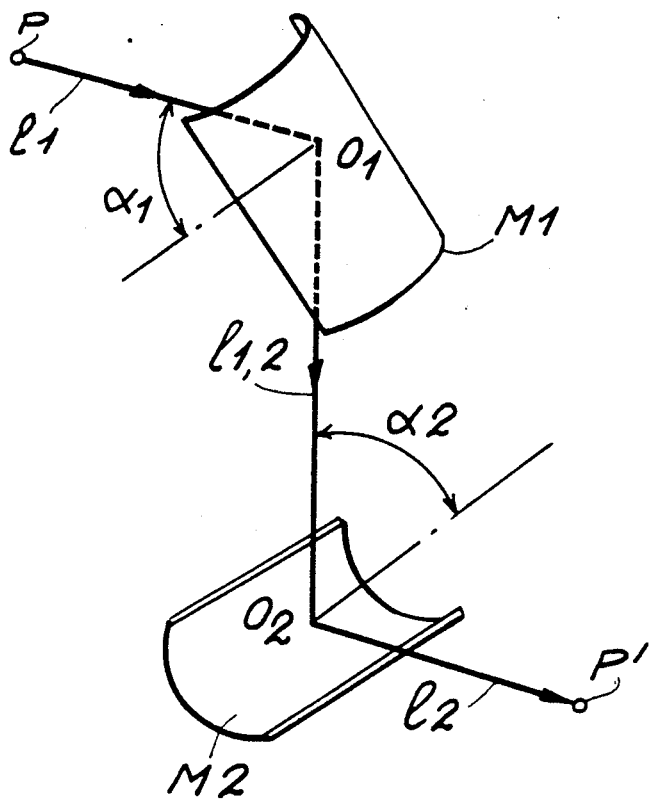
FIG. 3 shows yet another system known in the prior art.
Figure 4:
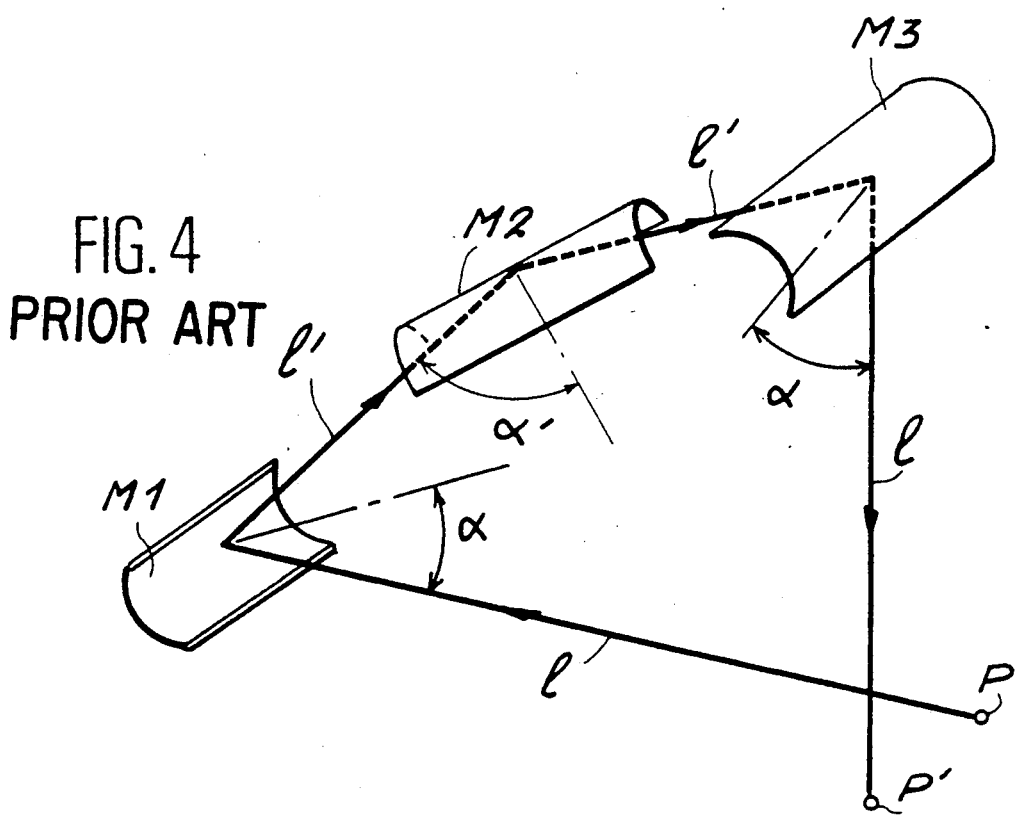
FIG. 4, already described, shows a realization according to the invention incorporating three mirrors.

In the FIG. 3 is shown a system of two mirrors M1 and M2, with radius of curvature R1 and R2, respectively. An object point P is situated at a distance L1 from the summit point (of incidence) O1 and an image point P' at a distance L2 from the summit point of incidence O2. The distance between the summits (point of incidence) O1 and O2 is denoted by L1,2. The incident angle on M1 is denoted alpha1 and the incident angle on M2 is denoted alpha2. The mirrors are oriented in a crosswise fashion, that is the planes perpendicular to their respective generators, are perpendicular to each other. In other words, the generators of the two cylindrical mirrors are orthogonal straight lines. The notation as developed in this paragraph and illustrated in this figure will be used to illustrate the slightly more complicated geometry of the simpler embodiments of the invention as illustrated in FIGS. 4, 5, 6.

The radii of curvature R1 and R2 are defined by:

$$R1 = 2f1/\cos(\text{alpha1});$$

$$R2 = 2f2/\cos(\text{alpha2});$$

where f1 and f2 are given by:

$$1/f1 = 1/l1 + 1/(l1,2 + l2);$$

$$1/f2 = 1/(l1 + l1,2) + 1/l2.$$

In a particular case, one could choose alpha1=alpha2=45°. The incident and reflected rays in this case are thus parallel, and the radii of curvature are $2\sqrt{2}$ f1 and $2\sqrt{2}$ f2. In a symmetrical system, with l1=l2, one has also f1=f2=f and R1=R2= =$2\sqrt{2}$ f.

This two-mirror system, although easy to realize, nvertheless has a major drawback, in that it deforms the beam. If the beam has a circular cross section at the object point P, the cross section will be elliptical at the image point P'. The reason is that, in the propagation plane, the ratio y'/y of the dimensions of the image to those of the object is equal to:

$$y'/y = l2/(l1 + l1,2),$$

whereas in the perpendicular plane, the ratio x'/x of the dimensions is equal to:

$$x'/x = (l1,2 + l2)/l1$$

A beam of right circular cross section at the object point P thus is transformed into a beam of right elliptical cross section at the image point P', with the ratio of the axes of the ellipse are given by:

$$y'/x' = (l1).(l2)/(l1 + l1,2).(l2 + l1,2).$$

To correct this defect, a system according to the invention can be used, of which several embodiments in some of the simplest configurations are shown in FIGS. 4, 5, 6.

The FIG. 4 shows an embodiment of the invention comprising three cylindrical mirrors M1, M2, M3, in which the first two mirrors ($M_1$ and $M_2$) are of similar geometry and orientation as those shown in the FIG. 3 and described in the preceeding paragraphs, and wherein the concave part of the third concave mirror M3 is oriented towards the second mirror M2, and the third mirror M3 is oriented in a crosswise fashion with respect to the second mirror M2, that is the planes perpendicular to their respective generators, are perpendicular to each other. In other words, the generators of the two cylindrical mirrors M2 and M3 are orthogonal straight lines. In the embodiment illustrated in this FIG. 4, the third mirror M3 is identical to the first mirror M1, and furthermore, the first mirror M1 and the third mirror M3 are arranged in a symmetrical fashion with respect to the second mirror M2.

The radius of curvature R of the first and third mirrors M1 and M3 and the radius of curvature R' of the second mirror M2 are given by:

$$R = 2f/\cos(\text{alpha})$$

and $$R' = 2f'/\cos(\text{alpha'}),$$

where:

alpha is the incident angle on the first and third mirrors M1,M3 alpha' is the incident angle on the second mirror M2.

The focal lengths f and f' are determined by the relations:

$$f^{-1} = l^{-1} + (l + 2l')^{-1},$$

$$(f')^{-1} = 2(l + l')^{-1},$$

where:

l is the distance between the object point P and the summit of the first mirror M1, which is also equal to the distance between the summit of the third mirror M3 and the image point P', l' is the distance between the summit of the second mirror M2 and the summits of the first and third mirrors M1 and M3.

This embodiment comprising three mirrors can be used in a great number of modes in practical systems. Using the mode shown in FIG. 4 and described in the preceeding paragraphs, it is possible to obtain, for example, a change of direction of propagation of 90°, in order to change a horizontal wave into a vertical wave, by choosing the angles alpha and alpha' such that:

$$2(\text{alpha}) + \text{alpha'} = 3pi/4.$$

With alpha=alpha', for example, the incident angle on each of the mirrors is of 45°. With identical mirrors, the radius of curvature would then be $2\sqrt{2}$ f.

In another embodiment of the invention shown in FIG. 5, the input wave and output wave are parallel, but propagate in opposite directions.

In another embodiment of the invention as shown in FIG. 6, the input wave and output wave propagate in the same direction.

Another embodiment of the invention, as shown in the FIG. 7, comprises a double set of cylindrical mirrors M1, M3, M5, . . . and M2, M4, . . . , arranged on two sides of an axis ZZ'. The odd-numbered mirrors M1, M3, . . . are arranged with their generators parallel to the axis ZZ', whereas the even-numbered mirrors M2, M4, . . . are arranged with their generators perpendicular to the axis ZZ'.

As the generators of the odd-numbered mirrors M1, M3, M5, . . . are parallel to each other, these mirrors could be realized as a single and unique cylindrical mirror (as shown by the dashed lines appearing in the FIG. 7) mounted on a rigid support. The even-numbered mirrors M2, M4, . . . could be mounted on movable supports so as to permit fine tuning of the assembly.

To realize a cylindrical mirror which could be used in any of the embodiments of the invention, a construction such as shown in FIG. 8 could be used, construction according to which a support 10 comprises two parts 12 and 14 which are machined, extruded, or formed by any other manner such that their upper extremities have the shape desired for the right cross section of the cylindrical mirror to be realized (circular arc, elliptical arc, parbolic arc, etc . . . ). A sheet 18 is thus applied to the said upper extremities of said parts 12 and 14 and bent in such a manner as to conform to the shape of said upper extremities. The resulting construction forms a cylindrical mirror.

Figure 9:
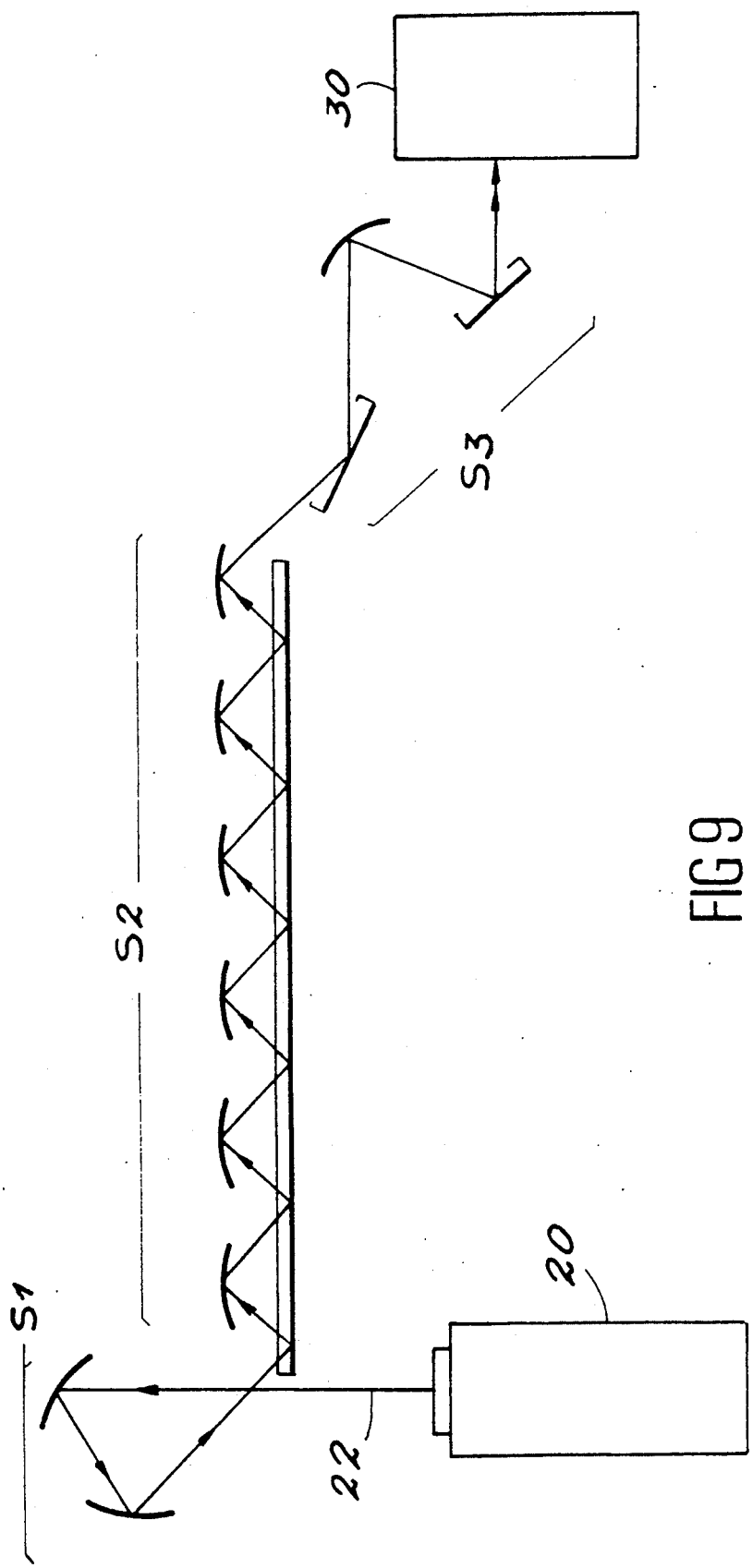
FIG. 9 shows an installation making use of a system according to the invention.

A final illustration FIG. 9 shows schematically a practical installation of various systems of mirrors according to the invention to be used to guide an electromagnetic wave. A source 20 of millimeter or submillimeter wavelength electromagnetic radiation delivers a vertical wave 22 which is sent by a first system S1 (which could be of the type shown in FIGS. 3 or 4) towards a second system S2 comprising a series of mirrors which face a single cylindrical mirror (such as shown in FIG. 7); a third system S3 comprising three mirrors (as shown in FIGS. 4, 5, or 6) sends the wave to a plasma machine 30.

In all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A system of mirrors for guiding an electromagnetic wave with minimum loss due to diffraction, characterized in that said system comprises at least three concave mirrors (M1, M2, M3) having the form of a portion of a cylinder, the concave part of a first mirror (M1) being oriented facing a second mirror (M2), the generators of the two mirrors (M1, M2) being perpendicular, and the concave part of a third mirror (M3) being oriented towards said second mirror (M2), the generators of the two mirrors (M2, M3) being perpendicular.

2. System according to claim 1, further characterized in that said third mirror (M3) is identical to said first mirror (M1), and in that said first (M1) and third (M3) mirrors are arranged in a symmetrical fashion with respect to said second mirror (M2).

3. System according to claim 2, further characterized in that the radius of curvature R of said first and third mirrors (M1,M3) and the radius of curvature R' of said second mirror (M2) are given by:

$$R = 2f/\cos(\alpha),$$

and $$R' = 2f'/\cos(\alpha'),$$

where:
alpha is the incident angle of an electromagnetic wave on said first and third mirrors (M1,M3), and
alpha' is the incident angle of the electromagnetic wave reflected from said first mirror on said second mirror (M2), and where f and f' are determined by the relations:

$$f^{-1} = l^{-1} + (l+2l')^{-1},$$

$$(f')^{-1} = 2(l+l')^{-1},$$

where:
l is the distance between an object point P and the point of incidence of said electromagnetic wave on said first mirror (M1), which is also equal to the distance between the point of incidence of said electromagnetic wave on said third mirror (M3) and an image point P',
l' is the distance between the point of incidence of said electromagnetic wave on said second mirror (M2) and the points of incidence of said electromagnetic wave on said first and third mirrors (M1,M3).

4. System according to claim 1, further characterized in that said system is comprised of a series of mirrors (M1,M3,M5 . . . M2,M4, . . . ) situated in an alternating fashion on either side of an axis (ZZ'), such that one mirror (Mn) out of any successive pair of mirrors (Mn,Mn+1) is oriented such that its generators are parallel to said axis, while the other mirror (Mn+1) of said pair is oriented such that its generators are perpendicular to said axis, for all such successive pairs of mirrors comprising said system.

5. System according to claim 4, further characterised in that said mirrors (M1,M3,M5 . . . ) oriented such that their generators are parallel to said axis (ZZ') comprise a single and unique cylindrical mirror oriented such that its generators are parallel to said axis and such that the concave portion of said single mirror is oriented facing the other mirrors comprising the system (M2,M4, . . . ).

6. System according to any one of the claims 1 to 5, characterized in that said cylindrical mirrors have circular cross section in a plane perpendicular to their generators.

7. System according to any one of the claims 1 to 5, characterized in that said cylindrical mirrors have parabolic cross section in a plane perpendicular to their generators.

8. System according to any one of the claims 1 to 5, characterized in that said cylindrical mirrors have elliptical cross section in a plane perpendicular to their generators.

* * * * *